United States Patent
Anschutz et al.

(10) Patent No.: US 7,099,944 B1
(45) Date of Patent: Aug. 29, 2006

(54) SYSTEM AND METHOD FOR PROVIDING NETWORK AND SERVICE ACCESS INDEPENDENT OF AN INTERNET SERVICE PROVIDER

(75) Inventors: Thomas Anschutz, Conyers, GA (US); Jeffrey P. Cassanova, Hiram, GA (US); Li Zhang, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 737 days.

(21) Appl. No.: 09/905,010

(22) Filed: Jul. 13, 2001

(51) Int. Cl.
*G06F 13/00* (2006.01)
*G06F 17/28* (2006.01)
*G06F 17/30* (2006.01)

(52) U.S. Cl. .................... 709/227; 709/245; 709/223; 370/352

(58) Field of Classification Search ................ 709/223, 709/250, 230, 245, 225–228, 224; 713/153; 710/105; 707/9–10, 103 R; 370/252, 352, 370/230, 351; 703/172
See application file for complete search history.

(56) References Cited

U.S. PATENT DOCUMENTS

| | | | |
|---|---|---|---|
| 5,729,689 A * | 3/1998 | Allard et al. ................ 709/228 |
| 6,404,736 B1 * | 6/2002 | Arkko et al. ................ 370/230 |
| 6,542,935 B1 * | 4/2003 | Ishii ............................ 709/245 |
| 6,603,758 B1 * | 8/2003 | Schmuelling et al. ........ 370/352 |
| 6,609,153 B1 * | 8/2003 | Salkewicz .................... 709/223 |
| 6,708,219 B1 * | 3/2004 | Borella et al. ............... 709/245 |
| 6,751,729 B1 * | 6/2004 | Giniger et al. ............... 713/153 |
| 6,769,000 B1 * | 7/2004 | Akhtar et al. ............ 707/103 R |
| 6,798,751 B1 * | 9/2004 | Voit et al. .................... 370/252 |

\* cited by examiner

*Primary Examiner*—David Wiley
*Assistant Examiner*—Jude J Jean-Gilles
(74) *Attorney, Agent, or Firm*—Potomac Patent Group PLLC (57) ABSTRACT

Systems and methods for providing personalized internet protocol (IP) services to an IP enabled device residing on a local area network (LAN) are disclosed. The systems and methods utilize an access device in communication with an access provider network, and involve communicating a first IP address to the access device, the first address allowing the access device to communicate with a first plurality of IP service devices through an Internet service provider (ISP), and communicating a second IP address to the access device, the second address allowing the access device to communicate with a second plurality of IP service devices in the access provider network. When the access device receives IP traffic from the IP enabled device it determines whether the IP traffic is addressed to one of the second IP service devices. If yes, the IP traffic is forwarded to the one of the second IP service devices with the second address as a return address. Otherwise, the IP traffic is forwarded to the ISP with the first address as the return address.

23 Claims, 5 Drawing Sheets

SYSTEM AND METHOD FOR PROVIDING NETWORK AND SERVICE ACCESS INDEPENDENT OF AN INTERNET SERVICE PROVIDER

I. BACKGROUND

A. Field of the Invention

This invention relates generally to the field of network design, and more particularly to systems and methods for providing access to one or more network(s) and various services without being served exclusively by a single Internet service provider.

B. Description of the Related Art

Figure 1:
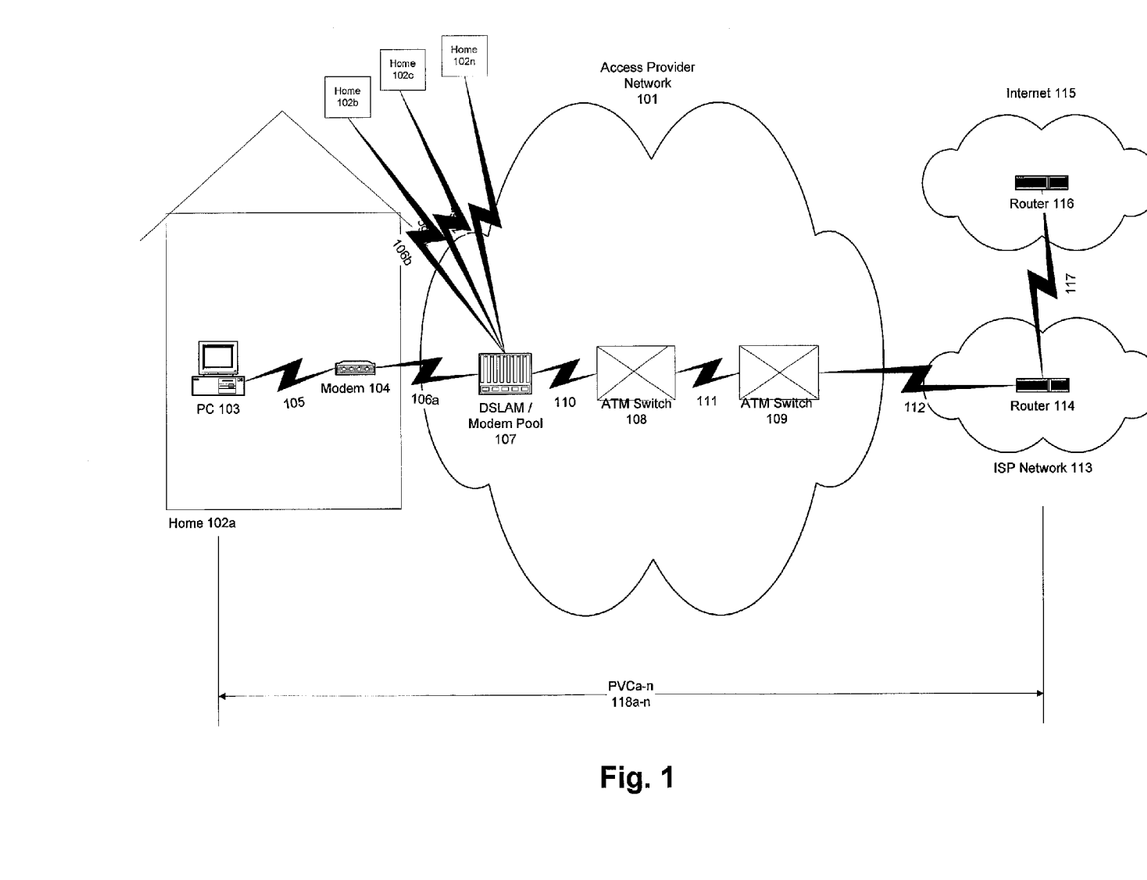
FIG. 1 is a diagram of a typical ADSL Internet access architecture employed today.

The service model for receiving Internet Service Provider (ISP) based services from sources on the Internet today assumes the exclusive use of an Internet access session by a single device or IP client in a one to one correspondence with a single ISP. In some topologies, typically business, one or more devices can be manually configured to access one or more service providers using a router and multiple access sessions at the same time. Dial-up access also can allow switching the access session on demand among service providers that attach to the Public Switched Telephone Network (PSTN) in some instances. That is, today's service model assumes that each connection to a service provider using an access device, be it a dial-up modem connection, DSL modem connection, cable modem connection, or other type of access session will be utilized by a single IP enabled device. FIG. 1 shows an asymmetric digital subscriber line (ADSL) Internet access architecture 100 typical of that encountered today. In order for an IP enabled device (e.g., personal computer 103 in home 102a) to establish a service session with a source on the Internet 115, the IP enabled device must first establish an access session with an Open Systems Interconnection (OSI) model layer 2/3 communications element (e.g., router 114) in an Internet service provider (ISP) network (e.g., ISP network 113) through an asynchronous transfer mode (ATM) infrastructure based access provider network (e.g., Access Provider Network 101) with an Internet access device (e.g., DSL modem 104). A private virtual circuit (PVC) is established at layer 2 between the DSL modem and the ISP layer 2/3 communications element (e.g., PVCa 118a between DSL Modem 104 and router 114) through the access provider network. An IP client (not shown) on the IP enabled device (e.g., personal computer 103) secures an IP address from the ISP using Dynamic Host Configuration Protocol (DHCP) from a DHCP server (not shown) in communication with the ISP's router. The DHCP server temporarily allocates or leases a unique IP address to the IP client. The IP client may now obtain IP based services available on the ISP network and beyond by sending and receiving packets to and from the ISP's router over the PVC. Sources on the Internet 115 can be reached by also utilizing a communications link between the ISP network and the Internet 115 (e.g., communications link 117).

Referring still to FIG. 1, note that for each IP enabled device (e.g., devices in homes 102b–102n) seeking to establish an Internet access session with the ISP network a separate layer 2 PVC (e.g., PVCb–n 118b–n) is established between each of the ADSL modems and the router in the ISP network. This leads to an ATM network that scales PVCs on the order of subscribers, and because the PVCs are "permanent" virtual circuits, they occupy network resources providing "always on" connections whether the subscribers are actively using them or not. Furthermore, the average bitrate on a given PVC is exceptionally low, partly because of the always on effect, and partly because Internet browsing allows for a great deal of statistical multiplexing. Because ATM infrastructure based access provider networks were not designed with this type of connection in mind though, establishing Internet access sessions with architecture 100 leads to numerous layer 2 PVCs of very limited bandwidth and eventually exhaustion of the ability to create any further layer 2 PVCs—long before the throughput capacity of the ATM switches is reached. In other words, the ATM switches in an ADSL architecture are VC constrained. Moreover, because of the single PVC extending from the IP enabled device to the ISP there is no opportunity for the operator of the access provider network to offer alternate destinations or additional services to the IP enabled devices in architecture 100. In an effort to overcome these limitations and others (such as the security risks associated with DHCP based IP address distribution) inherent in architecture 100 and support a larger number of IP enabled devices and Internet access sessions, the assignee of the present invention developed Internet access architecture 200 depicted in FIG. 2.

Figure 2:
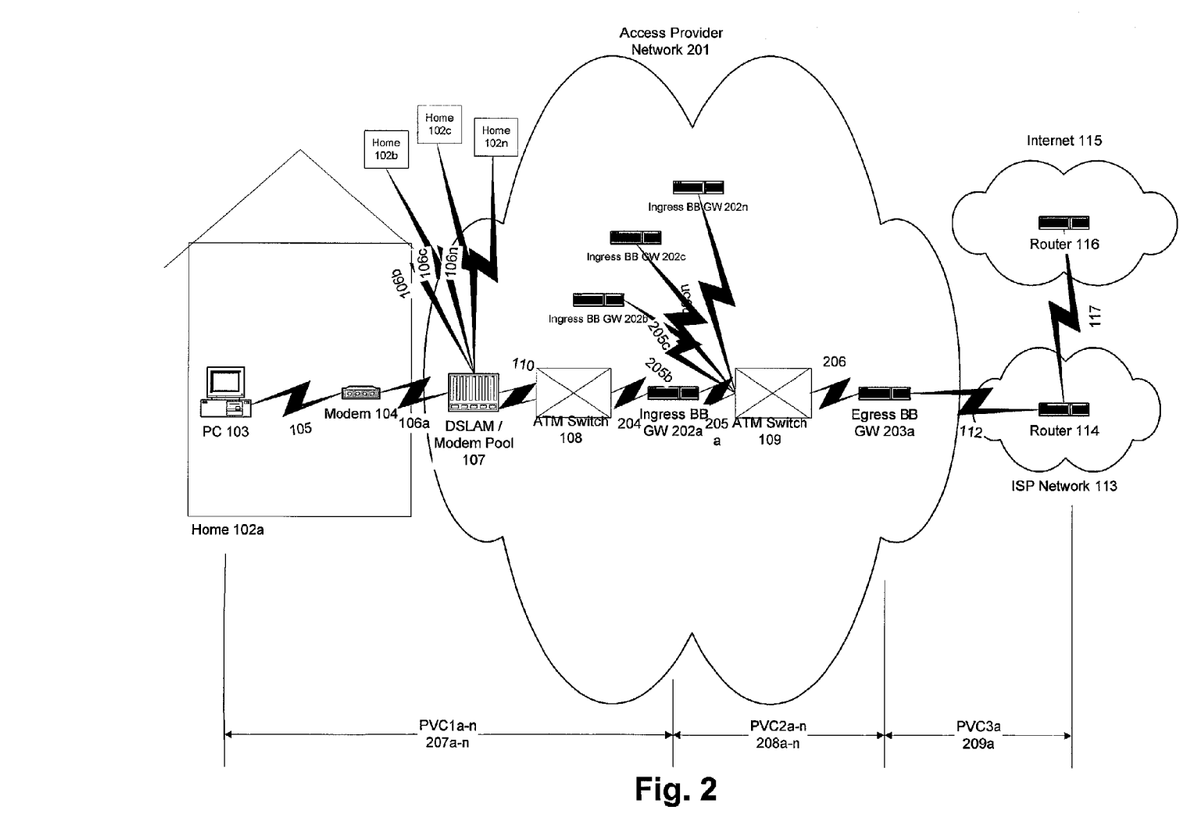
FIG. 2 is a diagram of a second ADSL Internet access architecture that improves upon the architecture depicted in FIG. 1.

In addition to the layer 2 communications elements (e.g., asynchronous transfer mode (ATM) switches 108 and 109) utilized in the access provider network 101 of Internet access architecture 100, layer 2/3 communications elements have been added to form access provider network 201 in Internet access architecture 200. Specifically, a plurality of layer 2/3 communications elements (e.g., ingress broadband gateways 202a–n) have been placed after various layer 2 communications elements (e.g., ATM Switch 108) lying near ingress points for access device IP traffic (e.g., IP traffic from personal computer 103), and a plurality of layer 2/3 communications elements (e.g., egress broadband gateway 203a) have been added after layer 2 communications elements (e.g., ATM Switch 109) lying near egress points for access device IP traffic destined for ISP networks (e.g., ISP network 113) linked to access provider network 201. In a preferred embodiment of the invention ATM switch 108 comprises a Lucent CBX 500 multiservice WAN switch, ATM switch 109 comprises a Lucent GX 550 multiservice WAN switch, DSLAM 107 comprises an Alcatel 7300 DSL Access Line Multiplexer, and ingress and egress broadband gateways 202, 203 comprise Nortel 5000 Broadband Service Nodes.

Each of the new layer 2/3 communications elements in access provider network 201 support the creation of layer 3 communications sessions between various communications elements within and without access provider network 201 using layer 3 protocols such as IP. The new layer 2/3 communications elements also support the creation of virtual layer 2 communications sessions or "virtual PVCs" as they were used in network 100, using one or more of the following protocols: Point-to-Point Protocol (PPP) over Ethernet (PPPoE), PPP over ATM (PPPoA), Layer 2 Tunneling Protocol (L2TP), Point-to-Point Tunneling Protocol (PPTP), and/or Switched Multimegabit Data Service (SMDS) Interface Protocol (SIP). Thus, rather than having a single layer 2 PVC (e.g., PVCa 118a) extending from an access device to an ISP through the access provider network as in architecture 100, with architecture 200 a series of three layer 2 virtual PVCs (e.g., PVC1a 207a, PVC2a 208a, and PVC3a 209a) extend from an access device (e.g., ADSL modem 104) to an ISP (e.g., ISP network 113) through access provider network 201.

The first layer 2 PVC (e.g., PVC1a 207a) extends from an access device (e.g., ADSL modem 103) to one of the added ingress layer 2/3 communications elements (e.g., ingress broadband gateway 202a), and is the only PVC devoted exclusively to a single IP subscriber. Typically the first layer 2 PVC is a user authenticated PPP session. In a preferred embodiment of the invention the first layer 2 PVC is a user authenticated PPPoE session where the IP enabled device (or the operator thereof) supplies a username and domain (e.g., "user1@domain1"). Based on the domain provided, the first layer 2/3 communications element establishes a virtual layer 2 connection using L2TP over the remaining two layer 2 PVCs to reach the appropriate ISP and the ISP provides the IP enabled device an IP address for obtaining IP based services from. This model allows for the creation of access sessions with different ISPs depending on the domain provided by the IP enabled device, albeit not with more than one ISP at the same time. This model also allows IP services to be billed to a particular user on a per access session basis.

The second PVC (e.g., PVC2a 208a) extends from the foregoing ingress layer 2/3 communications element (e.g., Ingress Broadband Gateway 202a) to one of the added egress layer 2/3 communications elements (e.g., Egress Broadband Gateway 203a). Through the use of a tunneling protocol such as L2TP, PPP aggregation occurs at the layer 2/3 ingress communications element and the multiple PPP communications sessions between access devices (e.g., access devices in homes 102b–n) served by the ingress layer 2/3 communications element are funneled into the second PVC. The third PVC (e.g., PVC3a 209a) extends from the foregoing egress layer 2/3 communications element (e.g., Egress Broadband Gateway 203a) to the layer 2/3 communications element in the ISP network. In this embodiment of the invention the layer 2/3 communications element in the ISP network is an LNS capable router (e.g., layer 2/3 communications element 114). Again, through the use of a tunneling protocol such as L2TP, PPP aggregation occurs at the egress layer 2/3 communications element and the multiple PPP communications sessions from multiple L2TP IBG tunnels are concentrated onto a single L2TP tunnel by the egress broadband gateway and are funneled into the third PVC. The third PVC delivers a large (doubly aggregated) L2TP tunnel to the LNS router 114 where the PPP sessions are terminated and IP packets are once again routed normally.

As stated above, the service model for receiving personalized IP based services from sources on the Internet today assumes the exclusive use of an Internet access session by a single user or IP enabled device. This assumption however is increasingly erroneous, particularly in the broadband access space, as more and more homes and other points of access utilize a single Internet access device to support a plurality of IP enabled devices. For instance, many homes and small businesses now have a plurality of IP enabled devices residing on a local area network (LAN) that are supported by a single Internet access device such as a DSL router/modem. It therefore will not be long before each of the IP enabled devices residing on these LANs (and or the users thereof) will seek to secure IP services from more than one source simultaneously, and most likely with differing quality of service (QoS) requirements, over a single network access arrangement. With today's ATM infrastructure based access provider networks (e.g., access provider network 101) and home or small business networking technologies, the latter of which rely on sharing a single IP address and assume routed or layer 3 access provider networks, providing IP services from different ISP sources to different IP enabled devices simultaneously over a single connection to access provider network is not possible. Furthermore, many of the IP enabled devices residing on access point LANs in the future will likely be low function devices (i.e., won't have the ability to run their own PPP stacks, but rather will have firmware that support DHCP based IP address configuration only). Thus, a need exists for systems and methods of providing individualized IP services to a plurality of IP enabled devices, including low function IP enabled devices, simultaneously over a single connection to an access provider network.

III. BRIEF DESCRIPTION OF THE DRAWINGS

These and other features, aspects, and advantages of the present embodiment of the invention will become better understood with regard to the following description, appended claims, and accompanying drawings where:

IV. DETAILED DESCRIPTION OF THE PREFERRED EMBODIMENTS

Figure 3:
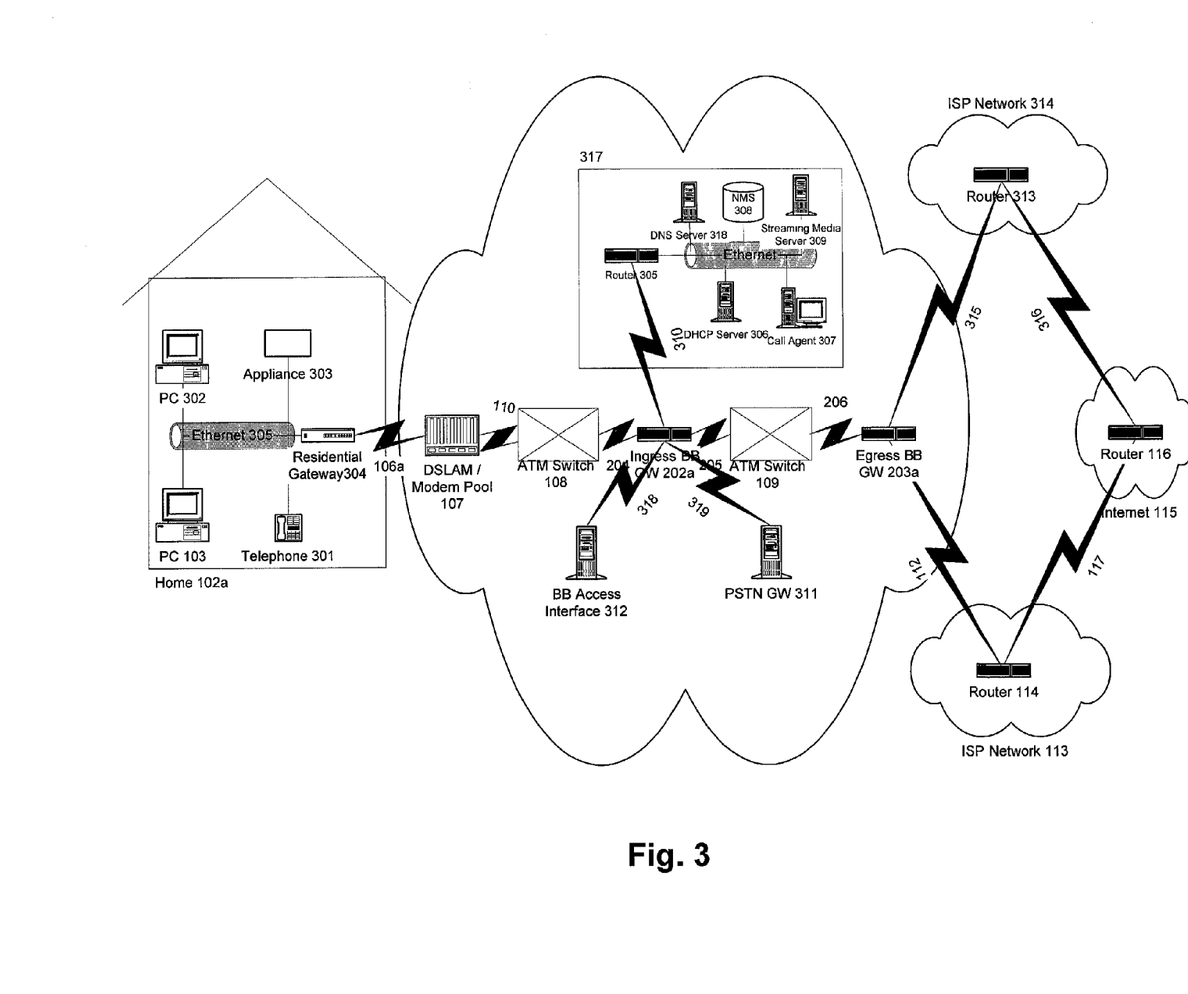
FIG. 3 is a diagram of a third ADSL Internet access architecture that allows the creation of multiple IP service sessions simultaneously over a single access arrangement.

Throughout the following detailed description similar reference numbers refer to similar elements in all the figures of the drawings. FIG. 3 shows a diagram of a novel third Internet access architecture 300 that allows the creation of multiple IP service sessions simultaneously over a single access session with an access provider network. In terms of additional communications elements, an IP aware e-center 317 and a number of related IP services related devices (e.g., broadband access interface 312 and public switched telephone network gateway 311) have been added to access provider network 201 to form access provider network 301 and modem 104 has been replaced with an access device (e.g., residential gateway 304) that manages an IP access session and individual IP service sessions for a plurality of networked IP enabled devices (e.g., PC 103, IP Telephone 301, PC 302, Appliance 303) at the particular access site (e.g., home 102a). In this embodiment of the invention access provider network 301 also comprises a domain name server (DNS) 318, IP clients (e.g., IP enabled devices, access devices, and the like) within access provider network 301 are configured to first query DNS 318 when trying to resolve a domain name, and DNS 318 is configured to resolve the domain name via an ISP (e.g., ISP network 113, ISP network 314) if DNS 318 cannot resolve the address itself. In another embodiment of the invention DNS 318 redirects the IP client to query a DNS residing on the Internet 115 through an ISP to resolve the domain name if DNS 318 cannot resolve the address itself.

At a minimum, e-center 317 is comprised of an e-center layer 3 communications element (e.g., router 305) in communication with a host configuration server (e.g., DHCP server 306). Exemplary host configuration servers include, but are not limited to, DHCP and Remote Authentication Dial In User Service (RADIUS) servers. In preferred embodiments of the invention e-center 317 also may comprise an IP telephony call agent (e.g., call agent 307), a customer network management system (e.g., NMS 308), a streaming media server (e.g., streaming media server 309), and/or a voice mail server (e.g., server 318) in communication with the e-center layer 3 communications element. The IP enabled devices residing on the LAN at an access site may comprise any number of IP enabled devices including, but not limited to, personal computers (e.g., PC 103 and PC 302), IP enabled telephones (e.g., telephone 301), and/or IP enabled appliances such as ovens, microwave ovens, refrigerators, heating and cooling systems, entertainment systems, televisions, stereo systems, VCR and DVD players, security systems, and the like (e.g., appliance 303). The IP enabled devices may comprise high and/or low function IP enabled devices. The LAN at an access site may be formed with any number of networking technologies including, but not limited to, Ethernet, homeRF, CableHome, HomePNA, IEEE 802.11 wireless LAN, and the like.

The access device typically comprises a layer 2/3 communications element which is managed by the operator of access provider network 301 and has some or all of the following additional functionality: provides local (private) addresses for use within the home network via an embedded DHCP server; performs network address and port translation (NAT/NPAT) so that the IP enabled devices can use their private address to reach public-address locations and services; provides a local name service (DNS) and resolves ambiguity that may arise from multiple connections to different name services at different ISPs; obtains a single household public IP address for communications with the access service provider network (by using a DHCP client in a preferred embodiment, alternately by using PPPoE or a like protocol); allows the creation of tunnels directly through the device; initiates alternate or additional PPPoE access sessions so that a group of devices on the home network may share communal services and/or a communal ISP; acts as a proxy for simple IP enabled devices on the home network (e.g., IP phones, gaming consoles, set top boxes, and the like) so they may access network and ISP services that would otherwise require a complex tunneled access client; inspects packets and assigns different IP QoS, Ethernet QoS, or ATM QoS capabilities inherent in the access architecture; and/or routes the plurality of connections. This added functionality allows the access gateway to distinguish between IP traffic utilizing an ISP provided IP address and IP traffic utilizing an IP address provided by e-center 317 (i.e., IP dialtone). Typically the access site gateway also will utilize an IP address translation protocol such as Network Address Translation (NAT) protocol to more efficiently utilize the IP address space. In a preferred embodiment of the invention the access site gateway comprises a Nortel BSN5000 (a.k.a. "Shasta").

In addition to the functionality discussed in connection with access provider network 201, in access architecture 300 the layer 2/3 communications elements in access provider network 301 lying near the ingress points for IP traffic from IP enabled devices (e.g., ingress BB GW 202a) have the following additional functionality: the ability to support multiple ATM VCs to a given customer; the ability to support multiple PPPoE access sessions on one or more ATM VCs; and the ability to support plain bridged IP-Ethernet frames on one or more ATM VCs. The ingress layer 2/3 communications elements in architecture 300 may also have the ability to associate PPP access sessions with a set of L2TP tunnels or VPNs that represent an ISP, based on the domain name provided in the PPP protocol authentication phase, and/or the ability to terminate PPP sessions and then route that traffic (as well as the non-encapsulated IP-Ethernet frames) using standard router techniques and protocols (e.g., the ability to forward DHCP requests using DHCP Relay as is typically found in router feature sets). This additional functionality allows the ingress layer 2/3 communications element to recognize and handle multiple instances of IP service sessions occurring at both layer 2 and layer 3.

Figure 4A:
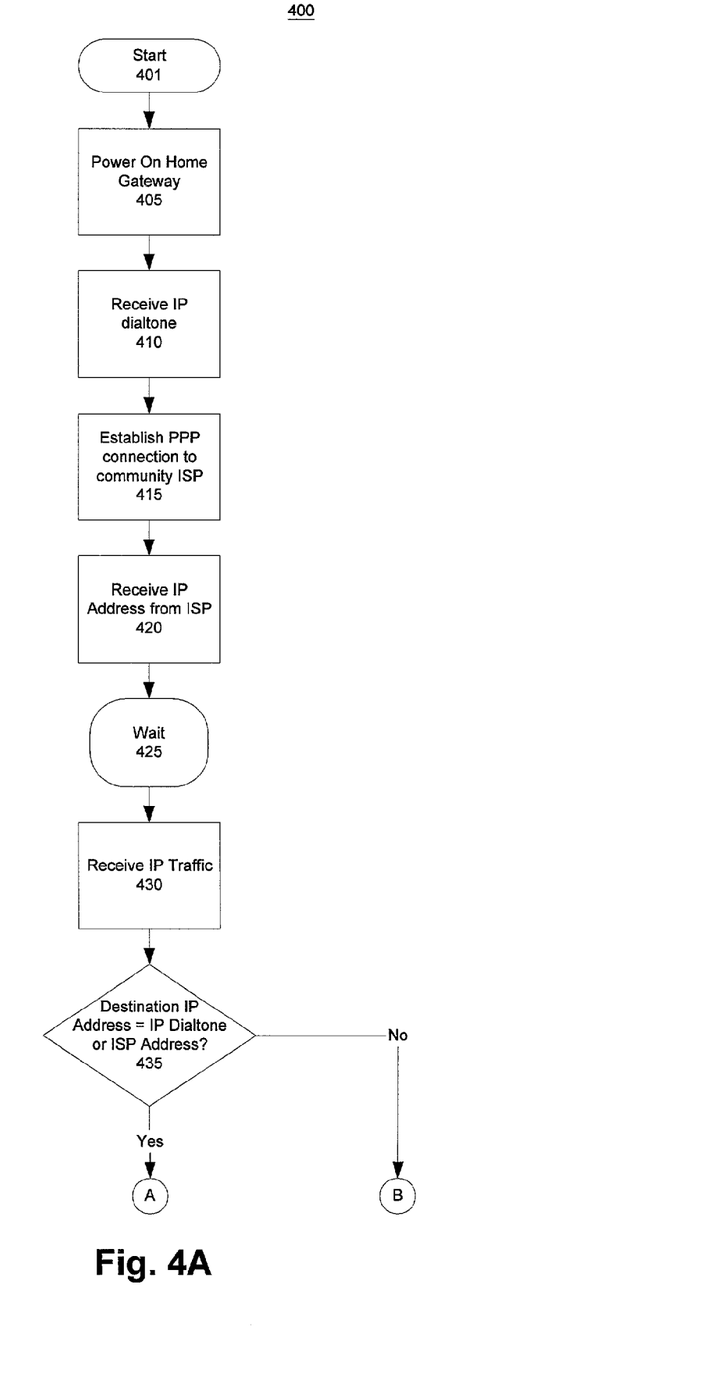
FIGS. 4A and 4B are a flow diagram of an exemplary method for providing a plurality of personalized IP service sessions over a single access session using the Internet access architecture depicted in FIG. 3.
Figure 4B:
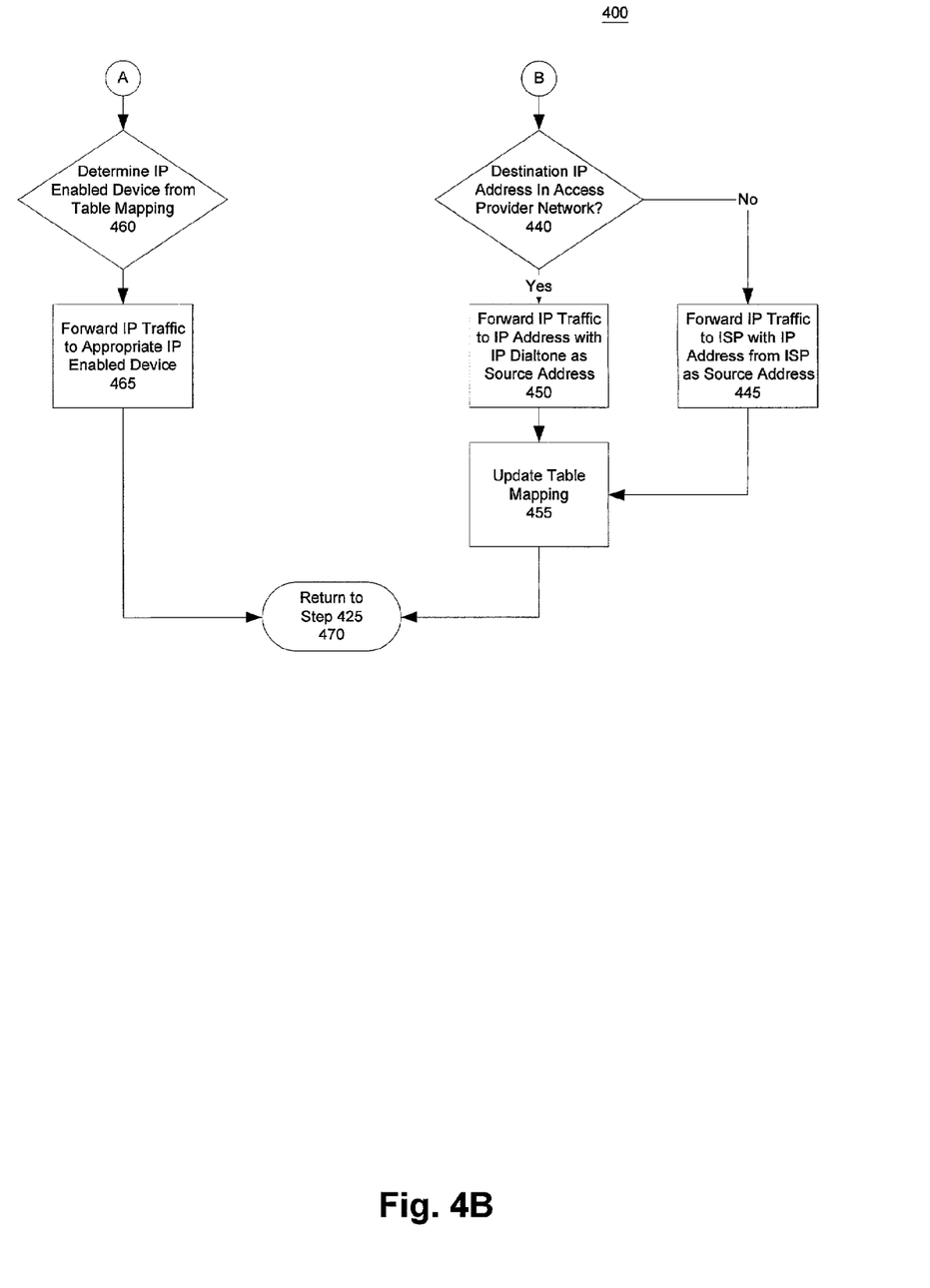

FIG. 4 shows a flow chart for an exemplary method 400 for providing independent or personalized IP service sessions to a plurality of IP enabled devices residing on a LAN using the Internet access architecture 300 depicted in FIG. 3. In step 401 the process starts. In step 405 the access device (e.g., residential gateway 304) is powered on. Upon power up the access device establishes communication with access provider network 301 and requests an IP address from access provider network 301. In response to the request by the access device, in step 410 the access device receives an IP address for obtaining IP services available within access provider network 301 only (i.e., IP dialtone) from an element in access provider network 301. In this embodiment of the invention, when residential gateway 304 powers up it sends a broadcast packet into access provider network 301 with a DHCP request. The broadcast packet is routed through access provider network 301 to DHCP server 306 and DHCP server 306 responds to the request by allocating residential gateway 304 IP dialtone. Upon allocating the IP dialtone DHCP server 306 sends the residential gateway 304 a packet containing the IP dialtone, network settings associated with the IP dialtone, and the duration of the lease, among other things.

In step 415 the access device establishes a PPP session with a pre-designated community ISP (e.g., ISP network 113) for the IP enabled devices residing on the LAN and requests an IP address from the ISP. In step 420 the ISP responds to the request and transmits IP traffic to the access device containing the IP address allocated to the access device by the ISP. In this embodiment of the invention, residential gateway 304 establishes a PPP connection to ISP network 113 via access provider network 301 and sends a default username and domain to an element in ISP network 113. The element in ISP network 113 authenticates the username and domain, allocates a public IP address, and transmits IP traffic back to the access device containing the public IP address and network settings associated with the address in addition to other information. The process then proceeds to step 425 where the access device waits to receive IP traffic from IP enabled devices residing on the LAN or access provider network 301.

In step 430 the access device receives IP traffic. In step 435 the access device examines a header in a packet to determine if its destination address is the IP dialtone or ISP address of the access device. If yes, the process skips ahead to step 460. If no, the process proceeds to step 440. Note, one skilled in the art will appreciate that there are numerous ways for determining if IP traffic is inbound or outbound. For example, in an alternative embodiment of the invention the access device may determine whether IP traffic is inbound or outbound from the port on which the traffic was received. Typical embodiments of the invention will allow any IP enabled device on the home network to initiate communication to the service network or to the Internet, but will only allow return traffic to the home that corresponds to those requests. This basic function may also be enhanced so that one or more IP enabled devices in the home network are identified to receive "unsolicited" or non-responding traffic directed to the home and the public (access or ISP) address at the home gateway. This arrangement would allow, for example, identifying that an IP telephone be designated to receive inbound IP phone calls addressed to the gateway.

In step 440 the process determines whether the destination IP address lies within the access provider network 301. Access provider network advertises the networks and addresses within in it to access device through standard protocols as would be understood by those skilled in the art. If the determination in step 440 is no, the access device forwards the IP traffic to ISP network 113 via access provider network 301 at layer 2 with the ISP provided address of the access device as the source address of the IP traffic and proceeds to step 455. In other words, the access device replaces the source IP address of the IP traffic with the ISP provided address of the access device and places the IP traffic in the PPPoEconnection extending from the access device to ISP network 113. If the determination in step 440 is yes, the process proceeds to step 450 where the access device forwards the IP traffic to the access provider network 301 at layer 3 with the IP dialtone of the access device as the source address of the IP traffic and proceeds to step 455. In step 455 the access device updates a table in its memory mapping the service session to the appropriate IP enabled device. The process then proceeds to step 470.

In step 460 the access device determines the identity of the IP enabled device on the LAN that is the intended recipient of the IP traffic. If other IP traffic has already been exchanged between the intended recipient and the source of the IP traffic the access device consults its table mapping to determine the IP enabled device that is the intended recipient. Otherwise, the access device will resolve which IP enabled device on the LAN is the intended recipient in a number of ways that will depend on the type of IP traffic and the type of IP enabled devices residing on the LAN, among other things. In step 465 the access device forwards the IP traffic to the IP enabled device on the LAN that is the intended recipient. In step 470 the process returns to step 425 and waits for the arrival of more IP traffic. Note that this routing and NPAT function ignores packets that might be presented to the access device but addressed to other devices in the home network.

With the ability to provide independent personalized IP sessions over a single access session, the invention also allows the operator of access provider network 301 to offer different qualities of service (QoS) for each service session. For instance, the operator of access network 301 can apply high QoS for VoIP traffic being exchanged between PSTN gateway 311 and IP telephone 301, while simultaneously applying very low quality of service to IP traffic being exchanged between PC 302 and the Internet 115 via ISP network 113 or 314. Moreover, the operator of access provider network 301 can guarantee a specified QoS for a particular service session if the IP traffic being exchanged in that service session need not exit access provider network 301. For example, because VoIP traffic being exchanged between IP telephone 301 and PSTN gateway with the IP dialtone never exits access provider network 301 the operator of access provider network 301 controls the entire communications path of the VoIP traffic and therefore can guarantee a certain QoS for this service session.

Similarly, the operator of access provider network 301 can provide faster, more secure broadband access to entities such as corporations who place a broadband access interface element (e.g., BB access interface 312) in access provider network 301 than would be available to those entities whose traffic must traverse the Internet 115 using virtual private network (VPN) technology and the like.

Further, the ability to provide IP dialtone gives true anonymity and provides the operator of access provider network 301 new business models that may be used to generate revenue. Access need not be provided on a monthly recurring charge basis, service sessions may be instant transactions such as credit or calling card based sessions, and service sessions need not be initiated at a particular user location. For example, a person may take a laptop computer (not shown) to a broadband access point such as an Internet café or laptop row in an airport (not shown) where the operator of access provider network has an access device with IP dialtone, establish communication between the laptop and the access device, and receive an IP address that provides very limited functionality or services supported only by advertising revenue. If the person wishes to receive additional IP services from access provider network 301 he or she communicates a credit or calling card number to an element in access provider network 301 rather than a username and a password to receive the additional IP services.

While the invention has been described in connection with the embodiments depicted in the various figures, it is to be understood that other embodiments exist and many modifications and additions may be made to the described embodiments without departing from the spirit of the invention. Therefore, the invention is not to be limited to any of the embodiments shown and described above, but rather construed in breadth and scope in accordance with the claims appended below.

We claim:

1. A system for providing Internet Protocol (IP) services from different Internet Service Providers (ISPs) to a plurality of different IP enabled devices via an access provider network, the system comprising:
   a plurality of different IP enabled devices;
   an access provider network connected to said different ISPs; and
   an access device which connects said different IP enabled devices to said access provider network;
   wherein said access provider network assigns a first IP address to said access device;
   wherein said access device establishes a service session with one of said plurality of different ISPs by assigning a second IP address from said one of said plurality of different ISPs to said access device;
   wherein when said access device receives IP traffic from one of said different IP enabled devices, said access device determines whether a destination IP address associated with said IP traffic is associated with said access provider network;
   wherein said access device forwards, if said destination IP address is not associated with said access provider network, said IP traffic to said one of said plurality of different ISPs using said second IP address as a source address of said IP traffic;
   wherein said access device otherwise, if said destination IP address is associated with said access provider network, forwards said IP traffic to said access provider network using said first IP address as said source address of said IP traffic;
   wherein said access device receives additional IP traffic from one of said different ISPs;
   wherein said access device determines which one of said plurality of different IP enabled devices is an intended recipient of said additional IP traffic by consulting a mapping table which maps said one of said plurality of different IP enabled devices to said one of said different ISPs based on previously exchanged traffic; and wherein said additional IP traffic is forwarded to said one of said plurality of different IP enabled devices.

2. The system of claim 1, wherein the different IP enabled devices includes an IP telephone, and the access provider network further comprises a telephone network gateway.

3. The system of claim 1, wherein the different IP enabled devices include a personal computer.

4. The system of claim 1, wherein the different IP enabled devices include an IP enabled appliance.

5. The system of claim 1, wherein the access provider network further comprises a user network management system.

6. The system of claim 1, wherein the access provider network further comprises a streaming media server.

7. The system of claim 1, wherein the access provider network further comprises a broadband access interface.

8. The system of claim 1, wherein the plurality of different IP enabled devices reside on a local area network (LAN) in communication with the access device.

9. The system of claim 8, wherein the access device utilizes Network Address Translation (NAT) protocol to provide the second IP address.

10. The system of claim 1, wherein the access provider network further comprises a Dynamic Host Configuration Protocol (DHCP) server.

11. The system of claim 1, wherein the access provider network further comprises a Remote Authentication Dial In User Service (RADIUS) server.

12. A method for providing Internet Protocol (IP) services from different Internet Service Providers (ISPs) to a plurality of different IP enabled devices via an access provider network, the method comprising the steps of:
    connecting said plurality of different IP enabled devices to said access provider network via an access device;
    assigning a first IP address from said access provider network to said access device;
    establishing, by said access device, a service session with one of said plurality of different ISPs by assigning a second IP address from said one of said plurality of different ISPs to said access device;
    receiving, by said access device, IP traffic from one of said different IP enabled devices;
    determining whether a destination IP address associated with said IP traffic is associated with said access provider network;
    forwarding, if said destination IP address is not associated with said access provider network, said IP traffic to said one of said plurality of different ISPs using said second IP address as a source address of said IP traffic; and
    otherwise, if said destination IP address is associated with said access provider network, forwarding said IP traffic to said access provider network using said first IP address as said source address of said IP traffic;
    receiving, by said access device, additional IP traffic from one of said different ISPs;
    determining, by said access device, which one of said Plurality of different IP enabled devices is an intended recipient of said additional IP traffic; and
    forwarding said additional IP traffic to said one of said plurality of different IP enabled devices;
    wherein said step of determining, by said access device, which one of said plurality of different IP enabled devices is an intended recipient of said additional IP traffic further comprises the step of:
    consulting a mapping table which maps said one of said plurality of different IP enabled devices to said one of said different ISPs based on previously exchanged IP traffic.

13. The method of claim 12, wherein the step of assigning the second IP address is accomplished using Network Address Translation (NAT) protocol.

14. The method of claim 12, wherein the different IP enabled devices includes an IP telephone, and the access provider network further comprises a telephone network gateway.

15. The method of claim 12, wherein the different IP enabled devices include a personal computer.

16. The method of claim 12, wherein the different IP enabled devices include an IP enabled appliance.

17. The method of claim 12, wherein the access provider network further comprises a user network management system.

18. The method of claim 12, wherein the access provider network further comprises a streaming media server.

19. The method of claim 12, wherein the access provider network further comprises a broadband access interface.

20. The method of claim 12, wherein the plurality of different IP enabled devices reside on a local area network (LAN) in communication with the access device.

21. The method of claim 12, wherein the access device utilizes Network Address Translation (NAT) protocol to provide the second IP address.

22. The method of claim 12, wherein the access provider network further comprises a Dynamic Host Configuration Protocol (DHCP) server.

23. The method of claim 12, wherein the access provider network further comprises a Remote Authentication Dial In User Service (RADIUS) server.

* * * * *